US012670837B1

(12) United States Patent
Chuang et al.

(10) Patent No.: US 12,670,837 B1
(45) Date of Patent: Jun. 30, 2026

(54) DISPLAY DEVICE, DISCHARGE CIRCUIT AND DISCHARGE METHOD

(71) Applicant: HIMAX TECHNOLOGIES LIMITED, Tainan City (TW)

(72) Inventors: Tsung-Lin Chuang, Tainan City (TW); Chuan-Chien Hsu, Tainan City (TW); Han-Shui Hsueh, Tainan City (TW); Chi-Rong Chou, Tainan City (TW)

(73) Assignee: HIMAX TECHNOLOGIES LIMITED, Tainan City (TW)

( * ) Notice: Subject to any disclaimer, the term of this patent is extended or adjusted under 35 U.S.C. 154(b) by 0 days.

(21) Appl. No.: 19/178,812

(22) Filed: Apr. 14, 2025

(51) Int. Cl.
*G09G 3/20* (2006.01)

(52) U.S. Cl.
CPC ... *G09G 3/2092* (2013.01); *G09G 2310/0267* (2013.01); *G09G 2310/0275* (2013.01); *G09G 2320/0233* (2013.01); *G09G 2330/022* (2013.01); *G09G 2330/028* (2013.01)

(58) Field of Classification Search
CPC ......... G09G 3/2092; G09G 2310/0267; G09G 2310/0275; G09G 2320/0233; G09G 2330/022; G09G 2330/028
USPC ............................................................ 345/55
See application file for complete search history.

(56) References Cited

U.S. PATENT DOCUMENTS

| | | | | |
|---|---|---|---|---|
| 2019/0066613 | A1* | 2/2019 | Chen | H03K 17/6871 |
| 2019/0304391 | A1* | 10/2019 | Zou | G09G 3/3648 |
| 2022/0115944 | A1* | 4/2022 | Ma | H02M 1/32 |
| 2022/0199008 | A1* | 6/2022 | Lee | G09G 3/3233 |

* cited by examiner

*Primary Examiner* — Jennifer T Nguyen
(74) *Attorney, Agent, or Firm* — JCIPRNET

(57) ABSTRACT

A discharge circuit includes a first subcircuit and a second subcircuit. The first subcircuit is coupled between a power supply voltage and a first reference voltage. The first subcircuit is enabled to provide a first discharge path between the power supply voltage and the first reference voltage, and generates a discharge control signal. The second subcircuit is coupled between the power supply voltage and a second reference voltage. The second subcircuit is coupled to the first subcircuit for receiving the discharge control signal, and the second subcircuit provides a second discharge path between the power supply voltage and the second reference voltage according to the discharge control signal.

19 Claims, 3 Drawing Sheets

DISPLAY DEVICE, DISCHARGE CIRCUIT AND DISCHARGE METHOD

BACKGROUND

Technical Field

The disclosure relates to a display device, a discharge circuit, and a discharge method, particular to the display device, the discharge circuit, and the discharge method capable of avoiding line mura when the power supply thereof is cut off.

Description of Related Art

In an application of display device, operation voltages with high voltage value may be generated based on a power supply voltage. In a normal power-off operation, the higher operation voltages are discharged firstly, and the power supply voltage can be discharged after voltage values of the operation voltages decreased to a specific low voltage value. But, in practical application, by hot swapping a power supply with the display device, the higher operation voltages and the power supply voltage are powered down at the same time. This may lead to a mura phenomenon (i.e., brightness uniformity). This mura phenomenon caused by the hot swapping usually appears in a line shape, thereby referred to as a line mura.

SUMMARY

The disclosure provides a display device, a discharge circuit and a discharge method for increasing a discharge speed of a power supply voltage.

The discharge circuit includes a first subcircuit and a second subcircuit. The first subcircuit is coupled between a power supply voltage and a first reference voltage. The first subcircuit is enabled to provide a first discharge path between the power supply voltage and the first reference voltage, and generates a discharge control signal. The second subcircuit is coupled between the power supply voltage and a second reference voltage. The second subcircuit is coupled to the first subcircuit for receiving the discharge control signal, and the second subcircuit provides a second discharge path between the power supply voltage and the second reference voltage according to the discharge control signal.

The display device includes a voltage generating circuit and a discharge circuit. The voltage generating circuit, receiving a power supply voltage, generating a plurality of operation voltages, and providing the operation voltages to a plurality of display drivers. The discharge circuit includes a first subcircuit and a second subcircuit. The first subcircuit is coupled between a power supply voltage and a first reference voltage. The first subcircuit is enabled to provide a first discharge path between the power supply voltage and the first reference voltage, and generates a discharge control signal. The second subcircuit is coupled between the power supply voltage and a second reference voltage. The second subcircuit is coupled to the first subcircuit for receiving the discharge control signal, and the second subcircuit provides a second discharge path between the power supply voltage and the second reference voltage according to the discharge control signal.

The discharge method includes: providing a first subcircuit to receive a power supply voltage; enabling the first subcircuit to provide a first discharge path between the power supply voltage and the first reference voltage; generating a discharge control signal by the first subcircuit; providing a second subcircuit to receive the power supply voltage and the discharge control signal; and providing a second discharge path between the power supply voltage and a second reference voltage according to the discharge control signal by the second sub-circuit.

Based on the above, the discharge circuit of present disclosure provides the first discharge path and the second discharge path to discharge the power supply voltage by two-stages manner. Such as that, a discharge speed of the power supply voltage during a power-off operation of the display device can be increased, and an abnormal image on the display device can be avoid correspondingly.

DETAILED DESCRIPTION OF DISCLOSED EMBODIMENTS

Figure 1:
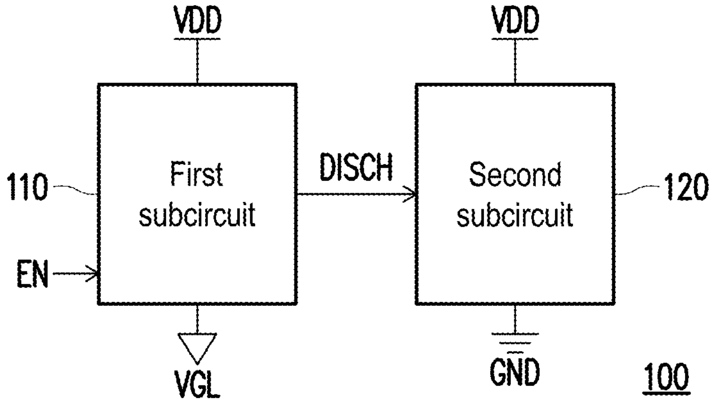
FIG. 1 illustrates a schematic diagram of a discharge circuit according to an embodiment of present disclosure.

The disclosure may be understood by referring to the following detailed description in conjunction with the accompanying drawings. It should be noted that in order to facilitate understanding to the reader and to simplify the drawings, the multiple drawings in the disclosure depict a part of the electronic device, and certain elements in the drawings are not drawn to actual scale. In addition, the number and size of each element in the figures are for illustration, and are not intended to limit the scope of the disclosure.

Please refer to FIG. 1, which illustrates a schematic diagram of a discharge circuit according to an embodiment of present disclosure. The discharge circuit 100 may be disposed in a display device, and is configured to pull down a power supply voltage VDD by discharging the power supply voltage VDD during a power-off operation of the display device. The discharge circuit 100 includes a first subcircuit 110 and a second subcircuit 120. The first subcircuit 110 is coupled between the power supply voltage VDD and a reference voltage VGL, and the second subcircuit 120 is coupled between the power supply voltage VDD and another reference voltage GND. The first subcircuit 110 receives an enable signal EN, and is enabled by the enable signal EN to provide a first discharge path between the power supply voltage VDD and the reference voltage VGL for performing a discharging operation, and the first subcircuit 110 may also generate a discharge control signal DISCH according to the discharging operation.

In this embodiment, when the power-off operation of the display device is operated, the enable signal EN may be set to a first logic value to enable the first subcircuit 110 to provide the first discharge path between the power supply voltage VDD and the reference voltage VGL. Such as that, a voltage value of the power supply voltage VDD may be reduced by a discharge current generated on the first discharge path, wherein the discharge current flows from the power supply voltage VDD to the reference voltage VGL. The first subcircuit 110 may generate the generate the discharge control signal DISCH according to a voltage variation of the power supply voltage VDD. That is, the first subcircuit 110 may initially set the discharge control signal DISCH at a relative high voltage value, and the first subcircuit 110 may be enabled to gradually pull down the discharge control signal DISCH according to the reducing of the power supply voltage VDD.

On the other hand, the second subcircuit 120 may be enabled according to the discharge control signal DISCH to provide a second discharge path between the power supply voltage VDD and the second reference voltage GND according to the discharge control signal DISCH. If this embodiment, when a voltage value of the discharge control signal DISCH is reduced to a certain voltage value, the second subcircuit 120 may be enabled, and the second discharge path may be provided to provide another discharge current for discharging the power supply voltage VDD. It should be noted here, the first discharge path and the second discharge path may be provided respectively by the first subcircuit 110 and the second subcircuit 120 simultaneously. Such as that the power supply voltage VDD may be discharge quickly, and be pulled down to the reference voltage GND.

When the display device enters the power-off operation, the discharge circuit 100 of present embodiment can discharge the power supply voltage VDD quickly. Such as that, a display function of the display device can be disabled quickly, and an abnormal image generated by the display device can be avoid.

Figure 2:
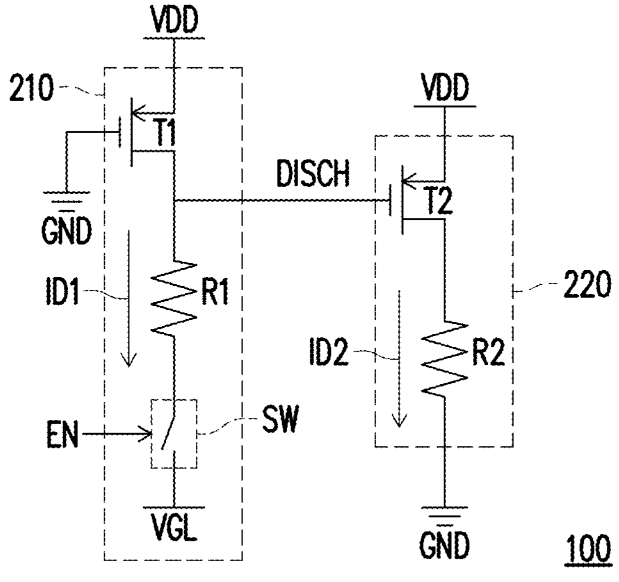
FIG. 2 illustrates a circuit diagram of a discharge circuit according to an embodiment of present disclosure.

Please refer to FIG. 2, which illustrates a circuit diagram of a discharge circuit according to an embodiment of present disclosure. The discharge circuit 200 includes a first subcircuit 210 and a second subcircuit 220. The first subcircuit 210 is coupled to the second subcircuit 220. The first subcircuit 210 is coupled between a power supply voltage VDD and a reference voltage VGL, and the second subcircuit 220 is coupled between the power supply voltage VDD and another reference voltage GND. In this embodiment, during a normal operation condition, a voltage value of the power supply voltage VDD is larger than a voltage value of the reference voltage GND, and the voltage value of the reference voltage GND may be larger than a voltage value of the reference voltage VGL.

In this embodiment, the first subcircuit 210 includes a transistor T1, a resistor R1 and a switch SW. The transistor T1, the resistor R1 and the switch SW are coupled in series. In this embodiment, a first end of the transistor T1 receives the power supply voltage VDD; a second end of the transistor T1 is coupled to a first end of the resistor R1; and a control end of the transistor T1 receives the reference voltage GND. A second end of the resistor R1 is coupled to a first end of the switch SW; a second end of the switch SW receives the reference voltage VGL; and a control end of the switch SW receives an enable signal EN.

In this embodiment, the transistor T1 may be a P-type transistor. Since the control end of the transistor T1 receives the reference voltage GND which may be a reference ground voltage, the transistor T1 may be constantly turned on. Besides, the switch SW may be a transistor switch, and when the enable signal EN is at specific voltage value (such as at logic value 1), the switch SW may be turned on. On the contrary, if the enable signal EN is not at specific voltage value (such as at logic value 0), the switch SW may be cut-off.

In this embodiment, when a display device enters a power-off operation, the enable signal EN may be set to at logic value 1. At this time, the switch SW is turned on, and the turned on transistor T1, the turned on switch SW and the resistor R1 may form a first discharge path and provides a discharge current ID1 from the power supply voltage VDD to the reference ground VGL for performing a discharging operation. According to the discharging operation, the voltage value of the power supply voltage VDD may be gradually decreased.

It should be noted here, a connection end between the second end of the transistor T1 and the first end of the resistor R1 may generate a discharge control signal DISCH. If the switch SW is cut-off, the power supply voltage may keep on a high voltage value, and a voltage value of the discharge control signal DISCH equal to the voltage value of the power supply voltage VDD may keep on the high voltage value, too. When the switch SW is turned on, during the discharging operation of the first discharge path, the voltage value of the discharge control signal DISCH may be gradually decreased corresponding to a decreasing voltage of the power supply voltage VDD.

On the other hand, the second subcircuit 220 includes a transistor T2 and a resistor R2. A first end of the transistor T2 receives the power supply voltage VDD; a second end of the transistor T2 is coupled to a first end of the resistor R2; and a control end of the transistor T2 is coupled to the first subcircuit 210 for receiving the discharge control signal DISCH. A second end of the resistor R2 receives the reference voltage GND.

In this embodiment, the transistor T2 may be P-type transistor, the transistor T2 may be cut-off when the discharge control signal DISCH is at a relative high voltage value. When the first subcircuit 210 enables the first discharge path, and the voltage value of the discharge control signal DISCH is decreased to a first voltage, the transistor T2 may be turned on and the second subcircuit 220 may establish a second discharge path. In this embodiment, the first voltage equals a summation of the reference voltage GND and a threshold voltage of the transistor T2.

When the transistor T2 is turned on, the second discharge path provided by the second subcircuit 220 may provide a discharge current ID2 flowing from the power supply voltage VDD to the reference voltage GND. At this time, the power supply voltage VDD is discharged by both the discharge currents ID1 and ID2, and the voltage value of the power supply voltage VDD can be pulled down to the reference voltage GND quickly.

In some embodiments, in the first subcircuit 210, a position of the switch SW can be adjusted to be connected between the transistor T1 and the resistor R1. The illustration of FIG. 2 is merely an example, and not used to limit scope of present disclosure.

Figure 3:
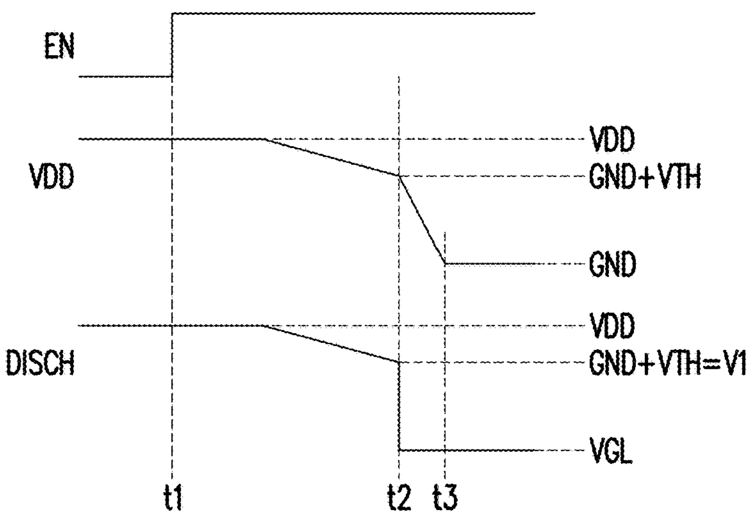
FIG. 3 illustrates a waveform plot of the discharge circuit according to an embodiment of present disclosure.

Please refer to FIG. 2 and FIG. 3 commonly, wherein FIG. 3 illustrates a waveform plot of the discharge circuit according to an embodiment of present disclosure. In FIG. 3, the enable signal EN is set to logic value 1 at a time point t1 when a display device transmits a power-off command. Such as that, the switch SW is turned on at the time point t1, and the first discharge path is established to provide the discharge current ID1 by the first subcircuit 210 to discharge the power supply voltage VDD.

After the time point t1, the voltage value of the power supply voltage VDD is gradually decreased in a fist slope, and the voltage value of the discharge control signal DISCH is gradually decreased corresponding to the decreasing voltage of the power supply voltage VDD.

At the time point t2, when the voltage value of the discharge control signal DISCH is decreased to reach the first voltage V1 (=VDD+VTH, where VTH is a threshold voltage of the transistor T2), the transistor T2 is turned on and the second subcircuit 220 may establish the second discharge path to provide the discharge current ID2 to discharge the power supply voltage VDD.

After the time point t2, since the power supply voltage VDD is discharged by the discharge currents ID1 and ID2 commonly, the voltage value of the power supply voltage VDD may be decreased in a second slope, wherein an absolute value of the second slop is larger than an absolute value of the first slope. That is, in present embodiment, the power supply voltage VDD can be discharged by two steps. In a first step, the voltage value of the power supply voltage VDD may be decreased in a first speed between the time points t1 to t2; and in a second step, the voltage value of the power supply voltage VDD may be decreased in a second speed between the time points t2 to t3, where the second speed is larger than the first speed. At the time point t3, the voltage value of the power supply voltage VDD may be decreased to the reference voltage GND, and the voltage value of the discharge control signal DISCH may be decreased to the reference voltage VGL.

It should be noted here, the first slope can be determined by a resistance of the resistor R1. The second slope can be determined by a resistance of the resistors R1 and R2 connected in parallel.

Figure 4:
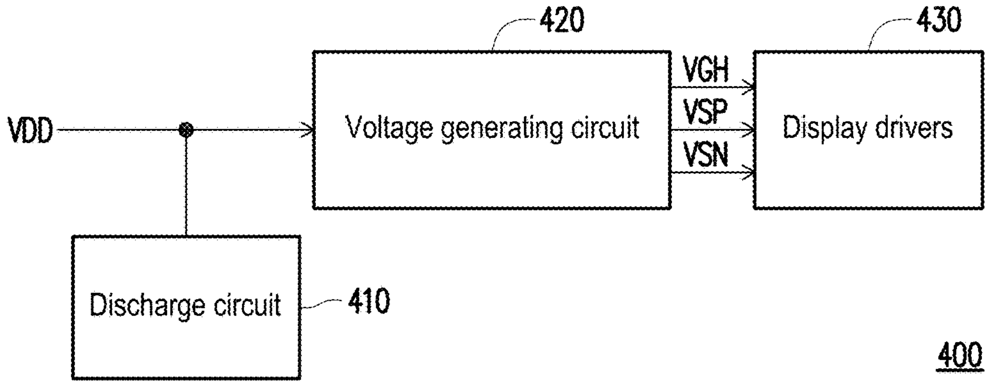
FIG. 4 illustrates a schematic diagram of a display device according to an embodiment of present disclosure.

Please refer to FIG. 4, which illustrates a schematic diagram of a display device according to an embodiment of present disclosure. The display device 400 includes a discharge circuit 410, a voltage generating circuit 420 and display drivers 430. The voltage generating circuit 420 receive a power supply voltage VDD, and generates a plurality of operation voltages VGH, VSP and VSN according to the power supply voltage VDD. The voltage generating circuit 420 further provides the operation voltages VGH, VSP and VSN to the display drivers 430. In this embodiment, the operation voltages VGH may be provided to gate drivers of the display drivers 430, and the operation voltages VSP and VSN may be provided to source drivers of the display drivers 430.

The discharge circuit 410 receives the power supply voltage VDD, and is configured to discharge the power supply voltage VDD during a power-off operation of the display device 400. The discharge circuit 410 may be implemented by the discharge circuit 100 or 200. Details of the discharge circuits 100 and 200 have been described in the embodiments mentioned above, and no more repeated descriptions here.

Figure 5:
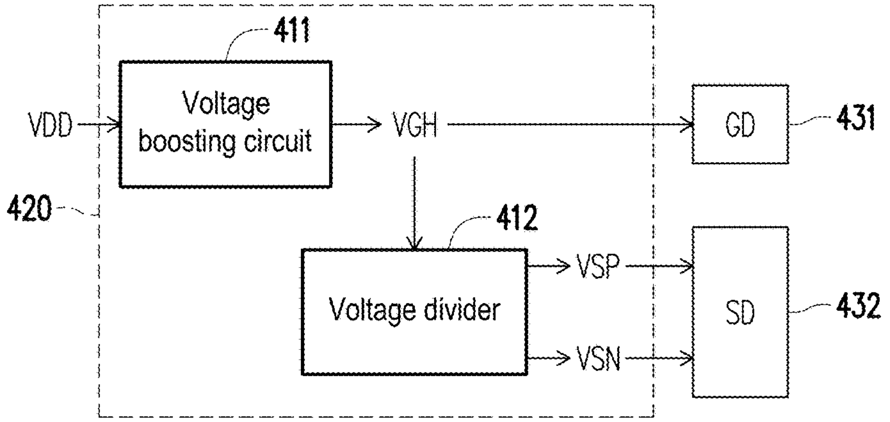
FIG. 5 illustrates a schematic diagram of the voltage generating circuit 420 according to the embodiment of FIG. 4.

Please refer to FIG. 5, which illustrates a schematic diagram of the voltage generating circuit 420 according to the embodiment of FIG. 4. The voltage generating circuit 420 includes a voltage boosting circuit 411 and a voltage divider 412. The voltage boosting circuit 411 receives the power supply voltage VDD, and generates the operation voltage VGH by perform a boosting operation based on the power supply voltage VDD. The voltage divider 412 is coupled to the voltage boosting circuit 411, and generates the operation voltages VSP and VSN by dividing the operation voltage VGH. Furthermore, the voltage generating circuit 420 may provide the operation voltage VGH to the gate drivers (GD) 431 of the display device 400, and the voltage generating circuit 420 may provide the operation voltages VSP and VSN to the source drivers (SD) 432 of the display device 400.

In this embodiment, the operation voltage VGH may provide a high-level voltage of gate driving signal of the gate drivers (GD) 431. The operation voltages VSP and VSN may respectively provide a high-level and a low-level voltages of source driver signals of the source drivers (SD) 432.

In this embodiment, the voltage boosting circuit 411 may be a DC-DC voltage boosting converter. The voltage boosting circuit 411 and the voltage divider 412 may be implemented by circuit structures well know by a person skilled in this art, and no special limitation here.

In this embodiment, the source drivers (SD) 432 and the gate driver (GD) 431 may be configured to drive EPD (Electronic Paper Display) panel, LCD (Liquid Crystal Display) panel, LED (Light Emitting Diode) panel or any type of display panel well known by a person skilled in the art, and no more special limitation here.

Figure 6:
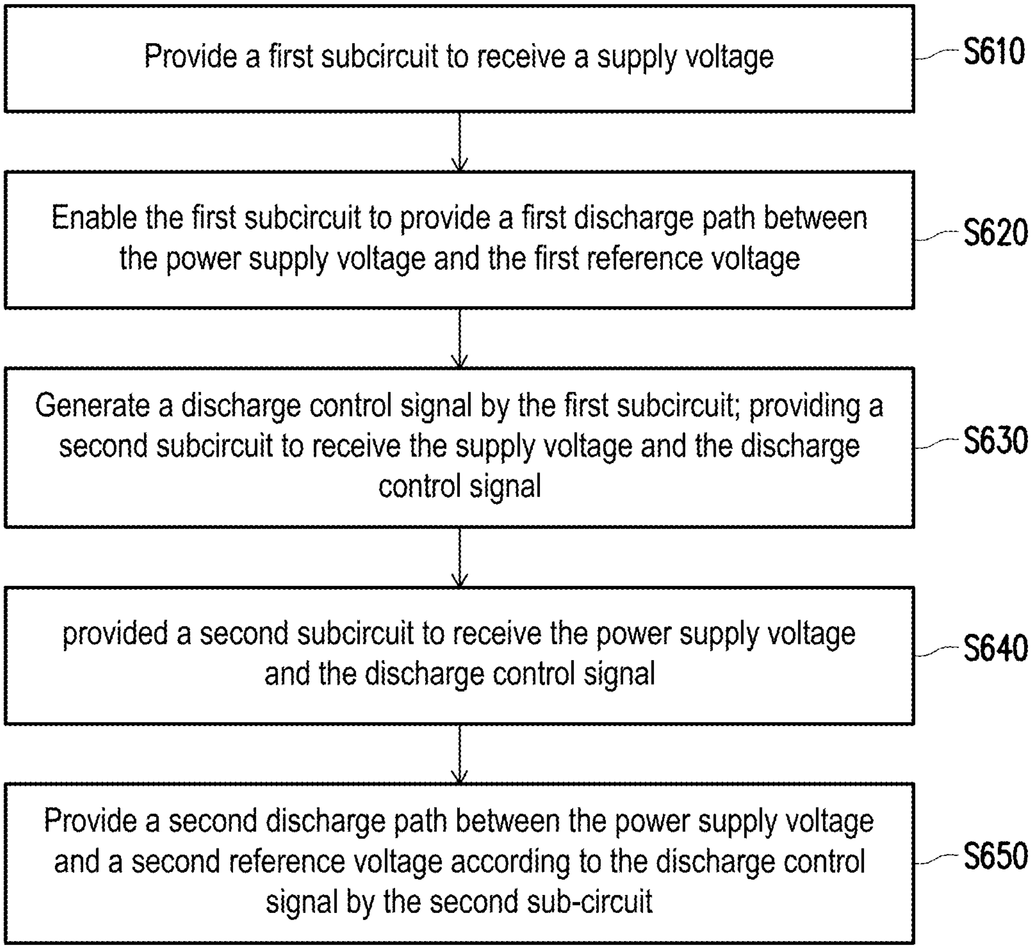
FIG. 6 illustrates a flow chart of a discharge method according to embodiment of present disclosure.

Please refer to FIG. 6, which illustrates a flow chart of a discharge method according to embodiment of present disclosure. In step S610, a first subcircuit is provided to receive a power supply voltage. In step S620, the first subcircuit is enabled to provide a first discharge path between the power supply voltage and the first reference voltage. In step S630, the first subcircuit may generate a discharge control signal, and in step S640, a second subcircuit is provided to receive the power supply voltage and the discharge control signal. In step S650, the second subcircuit provides a second discharge path between the power supply voltage and a second reference voltage according to the discharge control signal by the second sub-circuit.

Details of the steps S610 to S650 have been detailly described in the embodiments mention above, and no more repeated description here.

In summary, the discharge circuit of present disclosure may provide two discharge paths with two-steps manner during a power-off operation of the display device. Such as that, the internal power supply voltage of the display device can be discharged quickly during the power-off, and an abnormal image displayed by the display device can be avoid, and a display mura can be avoid.

What is claimed is:

1. A discharge circuit, comprising:

a first subcircuit, coupled between a power supply voltage and a first reference voltage, wherein the first subcircuit is enabled to provide a first discharge path between the power supply voltage and the first reference voltage, and generates a discharge control signal; and a second subcircuit, coupled between the power supply voltage and a second reference voltage, wherein the second subcircuit is coupled to the first subcircuit for receiving the discharge control signal, and the second subcircuit provides a second discharge path between the power supply voltage and the second reference voltage according to the discharge control signal, wherein the first subcircuit comprises:

a first transistor, having a first end receiving the power supply voltage and a control end receiving a bias voltage; and a first resistor, coupled between a second end of the first transistor and a first reference voltage, wherein a connection end between the second end of the first transistor and a first end of the first resistor generates the discharge control signal.

2. The discharge circuit according to claim 1, wherein the first subcircuit activates the first discharge path at a first time point, and the second subcircuit activates the second discharge path at a second time point after the first time point.

3. The discharge circuit according to claim 2, wherein the power supply voltage is discharged by the first discharge path and the second discharge path after the second time point to a third time point.

4. The discharge circuit according to claim 1, wherein the first subcircuit further comprises:

a switch, coupled between a connection path between the first resistor and the first reference voltage, and controlled by an enable signal.

5. The discharge circuit according to claim 4, wherein the switch is turned on according to the enable signal during a power-off operation.

6. The discharge circuit according to claim 1, wherein the second subcircuit comprises:

a second transistor, having a first end receiving the power supply voltage, and a control end receiving the discharge control signal; and a second transistor, coupled between a second end of the second transistor and a second reference voltage.

7. The discharge circuit according to claim 6, wherein the second reference voltage is larger than the first reference voltage.

8. The discharge circuit according to claim 6, wherein the discharge control signal is reduced from the power supply voltage to a first voltage to turn-on the second transistor, wherein the first voltage equals a summation of a threshold voltage of the second transistor and the second reference voltage.

9. A display device, comprising:

a voltage generating circuit, receiving a power supply voltage, generating a plurality of operation voltages, and providing the operation voltages to a plurality of display drivers; and a discharge circuit, receiving the power supply voltage, and is configured to discharge the power supply voltage during a power-off operation, wherein the discharge circuit comprises:

a first subcircuit, coupled between a power supply voltage and a first reference voltage, wherein the first subcircuit is enabled to provide a first discharge path between the power supply voltage and the first reference voltage, and generates a discharge control signal; and a second subcircuit, coupled between the power supply voltage and a second reference voltage, wherein the second subcircuit is coupled to the first subcircuit for receiving the discharge control signal, and the second subcircuit provides a second discharge path between the power supply voltage and the second reference voltage according to the discharge control signal, wherein the first subcircuit comprises:

a first transistor, having a first end receiving the power supply voltage and a control end receiving a bias voltage; and a first resistor, coupled between a second end of the first transistor and a first reference voltage, wherein a connection end between the second end of the first transistor and a first end of the first resistor generates the discharge control signal.

10. The display device according to claim 9, wherein the first subcircuit activates the first discharge path at a first time point, and the second subcircuit activates the second discharge path at a second time point after the first time point.

11. The display device according to claim 10, wherein the power supply voltage is discharged by the first discharge path and the second discharge path after the second time point to a third time point.

12. The display device according to claim 10, wherein the voltage generating circuit comprises:

a voltage boosting circuit, for generating a gate voltage by boosting the power supply voltage; and a voltage divider, coupled to the voltage boosting circuit, generating a first data voltage and a second data voltage by dividing the gate voltage, wherein the voltage boosting circuit provided the gate voltage to a plurality of gate drivers, and the voltage divider provides the first data voltage and a second data voltage to a plurality of source drivers.

13. The display device according to claim 10, wherein the first subcircuit comprises:

a switch, coupled between a connection path between the first resistor and the first reference voltage, and controlled by an enable signal.

14. The display device according to claim 13, wherein the second subcircuit comprises:

a second transistor, having a first end receiving the power supply voltage, and a control end receiving the discharge control signal; and a second transistor, coupled between a second end of the second transistor and a second reference voltage.

15. The display device according to claim 14, wherein the second reference voltage is larger than the first reference voltage.

16. The display device according to claim 14, wherein the discharge control signal is reduced from the power supply voltage to a first voltage to turn-on the second transistor, wherein the first voltage equals a summation of a threshold voltage of the second transistor and the second reference voltage.

17. A discharge method, comprising:

providing a first subcircuit to receive a power supply voltage;

enabling the first subcircuit to provide a first discharge path between the power supply voltage and the first reference voltage;

generating a discharge control signal by the first subcircuit;

providing a second subcircuit to receive the power supply voltage and the discharge control signal; and providing a second discharge path between the power supply voltage and a second reference voltage according to the discharge control signal by the second sub-circuit, wherein the first subcircuit comprises:

a first transistor, having a first end receiving the power supply voltage and a control end receiving a bias voltage; and a first resistor, coupled between a second end of the first transistor and a first reference voltage, wherein a connection end between the second end of the first transistor and a first end of the first resistor generates the discharge control signal.

18. The discharge method according to claim 17, further comprising:

activating the first discharge path at a first time point by the first sub-circuit; and activating the second discharge path at a second time point after the first time point by the second subcircuit.

19. The discharge method according to claim 18, further comprising:

discharging the power supply voltage by the first discharge path and the second discharge path after the second time point to a third time point.

* * * * *